US008928497B2

(12) United States Patent
Camus et al.

(10) Patent No.: US 8,928,497 B2
(45) Date of Patent: Jan. 6, 2015

(54) METHOD AND DEVICE FOR MONITORING AVIONICS SYSTEMS CONNECTED TO A SHARED MEDIUM

(75) Inventors: Jean-Michel Camus, Saint-Orens de Gameville (FR); Jerome Grieu, Toulouse (FR); Fabien Cases, Toulouse (FR); Christine Gris, Toulouse (FR); Patrick Ringeard, Saint-Genies Bellevue (FR)

(73) Assignee: Airbus Operations S.A.S., Toulouse (FR)

( * ) Notice: Subject to any disclaimer, the term of this patent is extended or adjusted under 35 U.S.C. 154(b) by 733 days.

(21) Appl. No.: 12/601,841

(22) PCT Filed: May 13, 2008

(86) PCT No.: PCT/FR2008/000663
§ 371 (c)(1),
(2), (4) Date: Nov. 25, 2009

(87) PCT Pub. No.: WO2008/152249
PCT Pub. Date: Dec. 18, 2008

(65) Prior Publication Data
US 2010/0176972 A1 Jul. 15, 2010

(30) Foreign Application Priority Data
May 31, 2007 (FR) .................................. 07 55387

(51) Int. Cl.
*G08B 21/00* (2006.01)
(Continued)

(52) U.S. Cl.
CPC ........ *G06F 11/0766* (2013.01); *G05B 23/0227* (2013.01); *G05B 23/027* (2013.01); *G06F 11/0709* (2013.01)
USPC .............. 340/945; 340/461; 307/10.1; 701/3; 701/9

(58) Field of Classification Search
CPC .... B64D 45/0015; B60K 35/00; G01C 23/00; G01C 5/005

USPC .......................................................... 340/945
See application file for complete search history.

(56) References Cited

U.S. PATENT DOCUMENTS

| 4,105,900 | A | * | 8/1978 | Martin et al. | ................. | 327/526 |
| 5,001,638 | A | * | 3/1991 | Zimmerman et al. | .......... | 701/14 |

(Continued)

FOREIGN PATENT DOCUMENTS

| FR | 2 891 379 | 3/2007 |
| WO | 2007 031426 | 3/2007 |

OTHER PUBLICATIONS

Sagaspe, L. et al., "Safe Allocation of Avionics Shared Resources", Ninth IEEE International Symposium, on High-Assurance Systems Engineering, pp. 25-33 (Oct. 12, 2005), XP010883029.

(Continued)

*Primary Examiner* — Daniel Wu
*Assistant Examiner* — Mohamed Barakat
(74) *Attorney, Agent, or Firm* — Oblon, Spivak, McClelland, Maier & Neustadt, L.L.P.

(57) ABSTRACT

A method monitors at least one avionic system connected to a communication medium that includes at least one active communication switch component. The method includes determining a state of the switch component and evaluating an indicator of a state of the communication medium from the state of the switch component and from a predetermined modeling of communication flows of the communication medium. The method also includes selecting and activating an alarm according to the evaluated state of the communication medium and according to a predetermined modeling of consequences of the evaluated state of the communication medium on a function of the at least one avionic system. A corresponding device and a method for determining conditions for alarm activation are also disclosed.

19 Claims, 6 Drawing Sheets

(51) Int. Cl.
*B60Q 1/00* (2006.01)
*G09F 9/00* (2006.01)
*H02G 3/00* (2006.01)
*G01C 23/00* (2006.01)
*G06F 17/00* (2006.01)
*G06F 7/00* (2006.01)
*G06F 11/07* (2006.01)
*G05B 23/02* (2006.01)

(56) References Cited

U.S. PATENT DOCUMENTS

| | | | |
|---|---|---|---|
| 6,178,379 B1 * | 1/2001 | Dwyer | 701/9 |
| 6,636,786 B2 * | 10/2003 | Partel | 701/3 |
| 6,697,718 B2 * | 2/2004 | Le Draoullec et al. | 701/31.6 |
| 6,763,289 B2 * | 7/2004 | Leonard et al. | 701/3 |
| 7,151,469 B2 * | 12/2006 | Gomez et al. | 340/945 |
| 7,436,297 B1 * | 10/2008 | Tucker | 340/541 |
| 7,589,431 B2 * | 9/2009 | Hentsch et al. | 307/10.1 |
| 2003/0048203 A1 * | 3/2003 | Clary et al. | 340/945 |
| 2004/0257246 A1 * | 12/2004 | Pahl et al. | 340/945 |
| 2008/0215927 A1 | 9/2008 | Roussel | |
| 2008/0249678 A1 | 10/2008 | Bailly et al. | |
| 2011/0160936 A1 * | 6/2011 | Campagne et al. | 701/3 |

OTHER PUBLICATIONS

Jack, H., "Automating Manufacturing Systems with PLCs: 6. Boolean Logic Design", No. 5.0, pp. 6.1-6.39 (May 4, 2007) XP002468120.

* cited by examiner

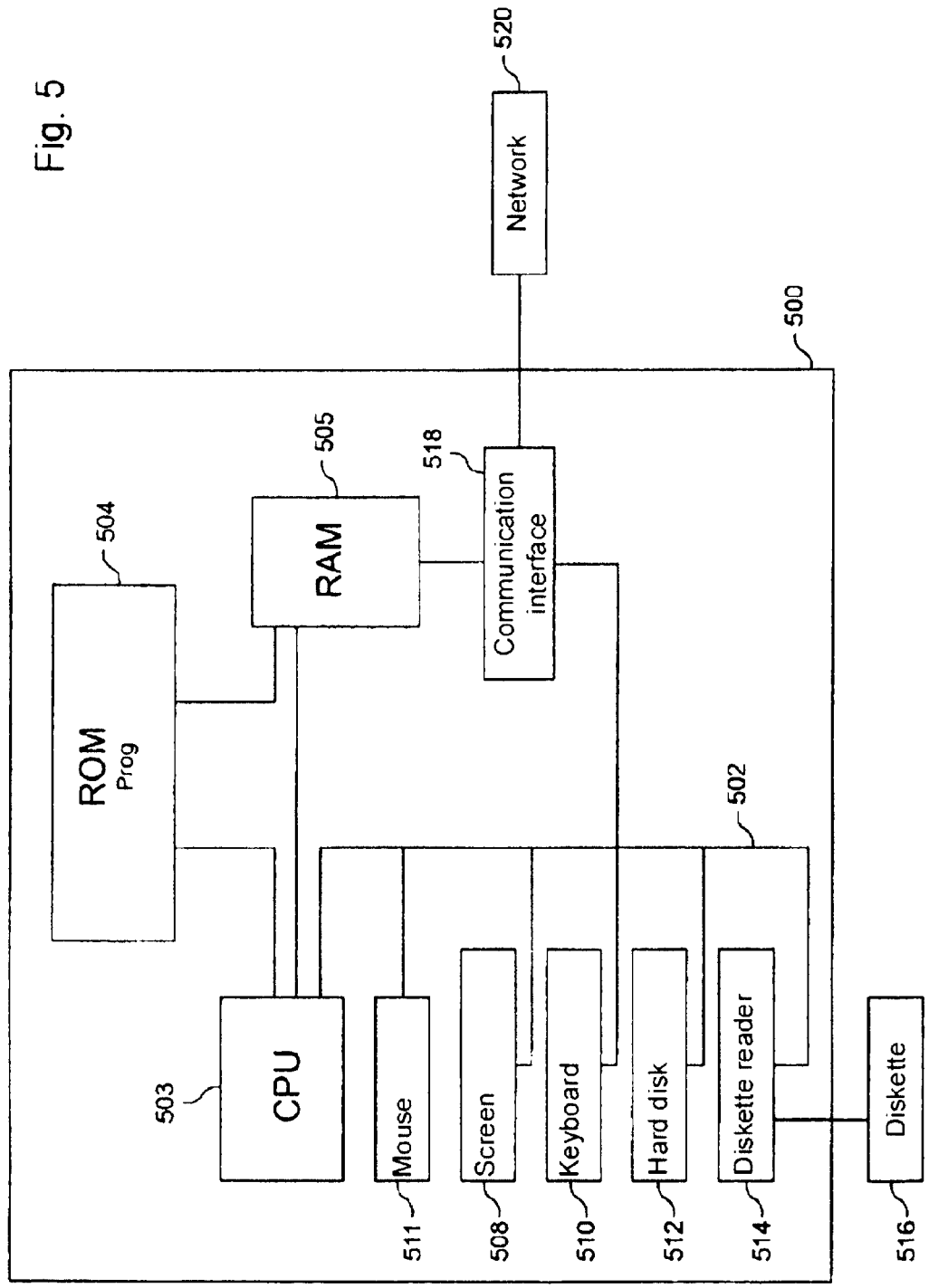

METHOD AND DEVICE FOR MONITORING AVIONICS SYSTEMS CONNECTED TO A SHARED MEDIUM

BACKGROUND OF THE INVENTION

1. Field of the Invention

This invention relates to the reliability of avionic systems and more particularly to a method and a device for monitoring avionic systems connected to a shared medium.

2. Discussion of the Background

The reliability of avionic systems is at the center of the concerns of aircraft designers. It generally is acknowledged that a redundancy of the key equipment items of aircraft is necessary in order to ensure the required functions despite the failure of one system as well as in order to compare the performance of the systems and to rapidly detect a possible failure.

The use of computer systems in aircraft has led the designers to implement computer networks for the transmission of information items and commands among the operational systems. The computer networks here are considered to be shared communication media used to exchange data. The capacity of these media is determined by the characteristics of the transmitted data, in particular their volume and their speed of transmission.

In particular in order to meet the increase in the number of transmitted data and the required transmission speeds, it can prove necessary nowadays to use active components in the computer networks, for example switches. The use of active components makes it possible to optimize transfer of the data according to the parameters linked to these data such as their nature and according to the state of the communication network, in particular its load.

SUMMARY OF THE INVENTION

While the use of passive components in aircraft computer networks is considered to be reliable (the reliability of these components generally is superior to that of the avionic systems), the use of active components can lead to a lowering of the overall reliability of the avionic systems as a result of their reliability.

The invention makes it possible to resolve at least one of the problems set forth above. In particular, the invention makes it possible to take into account breakdowns of one component of a shared communication medium in the handling of monitoring of a set of avionic systems performing operational functions, connected to this shared medium.

The invention thus has as an object a method for determining the conditions for activation of at least one alarm of at least one avionic system connected to a communication medium comprising at least one component, this method comprising the following steps, determining the conditions for activation of the said at least one alarm according to the state of the said at least one avionic system;

determining the conditions for activation of the said at least one alarm according to the state of the said at least one component of the said communication medium; and, storing in memory the said conditions for activation of the said at least one alarm and an identification of the said at least one alarm.

In this way the method according to the invention makes it possible to do away with the combinatorial analysis of breakdown configurations for the communication medium and to express the effects of breakdowns of the communication medium from a functional standpoint. The use of a unique form of representation makes it possible to simplify the specification and implementation of the associated logic.

The fact of not defining alarms for each of the states of the communication medium but adding to the logic already defined by the operational systems a logic taking these states into account makes it possible to limit the design effort for the alarms by focusing on the operational effects and not on the architectural implementation methods, while not impairing the level of false alarms. Moreover, since wording-type changes in the alarms by the operational systems do not impact the activation logic, the industrial process of keeping the alarms up to date is simplified.

The invention also has as an object a method for monitoring at least one avionic system connected to a communication medium comprising at least one component, this method comprising the following steps, determining the state of the said at least one component of the said communication medium;

evaluating an indicator of state of the said communication medium from the said state of the said at least one component of the said communication medium and from a formal predetermined modeling of the communication flows of the said communication medium; and, selecting and activating an alarm according to the said evaluated state of the said communication medium and according to a predetermined modeling of the consequences of the said evaluated state of the said communication medium on the functioning of the said at least one avionic system.

In this way the method according to the invention makes it possible to do away with the combinatorial analysis of breakdown configurations for the communication medium and to simplify the analysis of the effects of breakdowns of the communication medium.

The said determination of the state of the said at least one component of the said communication medium advantageously is accomplished with the aid of communication means independent of the said communication medium in order to improve the overall reliability and limit disruptions of the communication medium.

According to a specific embodiment, the said step of selecting an alarm comprises the following steps, Determining a breakdown of the said at least one component of the said communication medium; and, if the said breakdown of the said at least one component of the said communication medium has an impact on the functioning of the said at least one avionic system: selecting and activating an alarm linked to the said impact on the function of the said at least one avionic system.

In this way the method according to the invention makes it possible to simplify analysis of the consequences of breakdowns of the communication medium on the avionic systems.

Again according to a specific embodiment, if the said breakdown of the said at least one component of the said communication medium has no impact on the functioning of the said at least one avionic system and if the said breakdown affects communication between the said at least one avionic system and the means implementing the said monitoring method, the said method further comprises steps of selecting and activating an alert indicating that the said at least one avionic system no longer is being monitored.

In this way the invention makes it possible to distinguish the breakdowns having a direct impact on the avionic systems from the other breakdowns.

Again, according to a specific embodiment, the method further comprising the following steps, receiving an indication relating to the functioning of monitoring means, the said monitoring means implementing a method similar to the said monitoring method; and, evaluating the monitoring of the said at least one avionic system according to the said indication relating to the functioning of the said monitoring means and to the said indicator of state of the said communication medium.

In this way, analysis of the possible impairment of the monitoring performance makes it possible to direct the operator to alternative means according to the criticality of the operational function if necessary.

The method advantageously further comprises a step of confirming the said indicator of state of the said communication medium. According to a specific embodiment, the said confirming step is based on at least one information item received from the said at least one avionic system.

In this way the invention makes it possible to favor the positive information items considering that an operational system is able to determine its functional state and that the perceived state of the communication medium may be erroneous.

Each of the said alarms advantageously is defined by a logic specific to the said at least one avionic system to which the said indicator of state of the said communication medium is contributing if this is relevant for simplifying implementation.

The invention also has as an object a device in an aircraft comprising means adapted for the implementation of each of the steps of the method described above.

BRIEF DESCRIPTION OF THE DRAWINGS

Other advantages, purposes and characteristics of this invention become apparent from the detailed description that follows, presented by way of non-limitative example, with reference to the attached drawings in which.

DESCRIPTION OF THE PREFERRED EMBODIMENTS

The invention relates to a centralized monitoring system enabling the diagnosis of the monitored operational systems and of the functions performed by these systems as well as the development and display of alarms enabling an operator to handle the impaired situations resulting from impairments of these functions.

Redundancy of the centralized monitoring system preferably is implemented by means of functions independent of each other. The method for monitoring of the shared communication medium advantageously takes this independence into account, while ensuring coherence in the performance of these independent functions.

The architecture of the monitored operational systems comprises a communication medium shared among the different monitored operational systems made up in particular of one or more active components such as switches. It should be noted here that if the number of switches is high, the number of combinations representing possible breakdown configurations is substantial and that, for reasons of cost, it is hard to envisage an exhaustive detailed analysis.

The handling of the detected breakdowns varies according to the nature of the breakdowns. For example, only the operational functions performed by the monitored systems require the development of an information item in the event of impairment. As a matter of fact, the impairment of the communication medium function itself is not, a priori, an information item relevant for conducting the flight. Only an information item linked to the impact of this impairment on the operational user functions of the communication medium is relevant.

Monitoring of the systems and associated operational functions advantageously is performed through the communication medium used to perform the operational functions.

Implementation of the invention comprises two phases:

a preliminary analysis phase making it possible to model the data flows and the effects of breakdowns of the operational systems and of the disruptions in data flows; and, a monitoring phase based on the modeling done during the preliminary phase.

Figure 1A:
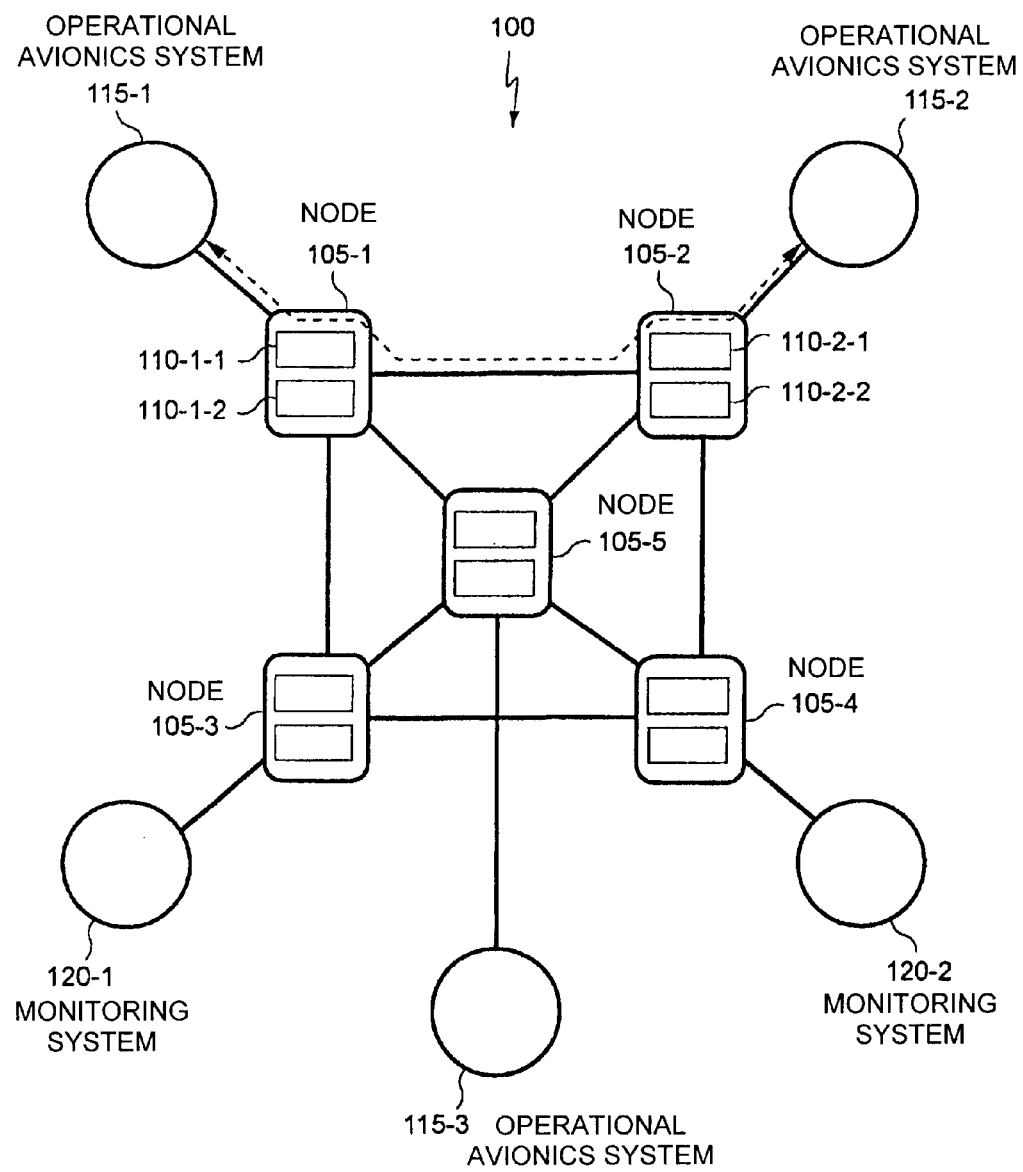
FIG. 1, consisting of FIGS. 1a and 1b, schematically shows a communication medium as well as means for observation of the active components of this medium, respectively.

FIG. 1a illustrates a shared communication medium in the form of communication network 100 made up of five nodes 105-1 to 105-5 as well as links between these nodes and between these nodes and the avionic systems and the monitoring systems. Each node here comprises two redundant components. For example, node 105-2 comprises redundant components 110-2-1 and 110-2-2. The components preferably are connected with each other so as to form two redundant and independent local networks, in such a way that the breakdown of one or more components of a local network does not affect communications among the systems connected to the communication network. For example, component 110-1-1 is connected to component 110-2-1 and component 110-1-2 is connected to component 110-2-2 while component 110-1-1 is not connected to component 110-2-2 and component 110-1-2 is not connected to component 110-2-1.

Access to the shared communication medium is achieved through a node 105-$i$.

The data flows in the communication network, that is, the paths taken through the network, here are determined in static manner in order to avoid a reconfiguration of the communication paths in the event of breakdown.

According to the example shown, three operational systems 115-1 to 115-3 are connected to the communication network. For reasons of clarity, each operational system here is composed of a sole equipment item.

The centralized monitoring system comprises two redundant equipment items 120-1 and 120-2. Each of the components 120-1 and 120-2 has a functioning independent of the functioning of the redundant component. In particular, the alert display devices are different. As soon as one of the equipment items of the monitoring system detects a condition or a set of conditions that requires display of an alert, it activates the display thereof without synchronization or verification with the redundant equipment item of the monitoring system. It should be noted that the topology of the communication network illustrated on FIG. 1a is provided only by way of example.

The state of the communication medium is analyzed by the two equipment items 120-1 and 120-2 of the centralized monitoring system.

Figure 1B:
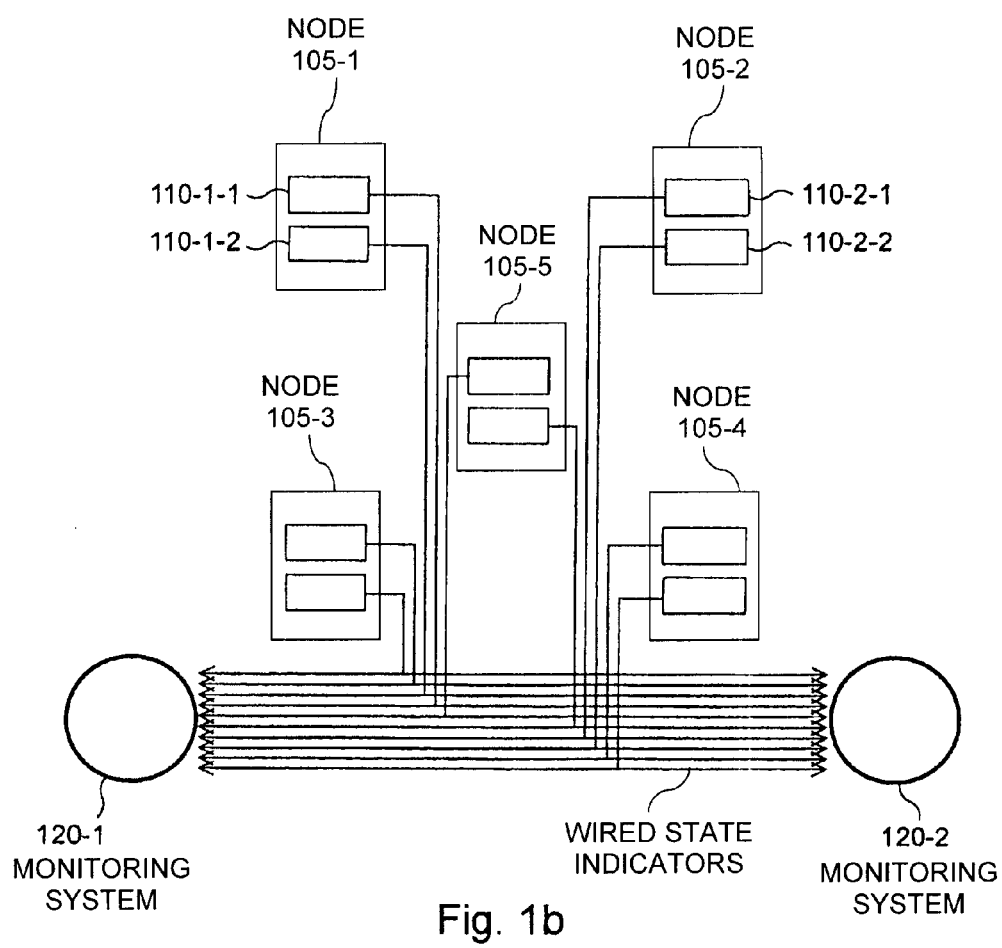

According to a specific embodiment illustrated on FIG. 1b, each equipment item of the centralized monitoring system receives an indicator of state of each communication node 105-$i$, for example a Boolean value, by means of a wired state indicator 112, that is, with the aid of a specific link between each equipment item of the monitoring system and each node of the shared communication medium, different from the shared medium. By way of illustration, the state of each node can assume one of the following values:

OK if the state indicator signals a normal functioning; and,
KO if the state indicator signals a breakdown.

By using these states, the notation 110-$i$-$j$_OK can be used, for example, if the component j of node 105-$i$ is functioning correctly. Conversely, if component 110-$i$-$j$ is not functioning correctly, the notation 110-$i$-$j$_KO can be used.

As indicated above, the communication flows between operational systems, identified by the paths taken through the communication medium, preferably are predetermined. Each path can be identified by the list of nodes traversed. Thus, for example, the communication flow between operational systems 115-1 and 115-2 through nodes 105-1 and 105-2 can be marked PATH(105-1, 105-2). Likewise, the communication flow between operational system 115-3 and the communication medium though node 105-5 can be marked PATH(105-5).

Each equipment item of the centralized monitoring system determines the state of the communication function from the state of each of the components making up the nodes traversed by a flow. A communication path is considered to be lost if the breakdown configuration of the components making up the path is such that the two redundant local networks are affected.

In considering, for example, the communication flow between operational systems 115-1 and 115-2, marked PATH(105-1, 105-2), the path PATH(105-1, 105-2) can be operational PATH(105-1, 105-2)_OK or broken down PATH(105-1, 105-2)_KO. The state of the communication flow PATH(105-1, 105-2) thus can be determined by the following relationships,

PATH(105-1,105-2)_KO=(110-1-1_KO OR 110-2-1_KO) AND (110-1-2_KO OR 110-2-2_KO)

where 'AND' and 'OR' represent an 'and logic' and an 'or logic,' respectively.

For each operational system and for each alert associated with this system, the breakdown condition or conditions of the system and of the communication medium are determined. These conditions can be determined by functional analysis and grouped in a table.

Let us consider an example according to which a functional analysis of operational system 115-1, independent of the structure of the communication network, shows that an alert of type 115-1_Alert-Fn1 is to be activated if internal function Fn1 is not available or cannot be executed (for example if a portion of this function is executed by operational system 115-2 and this operational system 115-2 is broken down or is not accessible).

In this way, it is possible to infer therefrom that the alert of type 115-1_Alert-En1 is to be activated under the following conditions, operational system 115-1 indicates to equipment items 120-1 and/or 120-2 of the monitoring system, a breakdown of the Fn1 function, with the aid, for example, of the message 115-1-Error-Fn1;

equipment items 120-1 and/or 120-2 of the monitoring system do not receive any message from operational system 115-1 although no breakdown is detected in the communication medium between component 115-1 and equipment items 120-1 and 120-2 of the monitoring system;

the communication flow between operational system 115-1 and the communication medium is disrupted; or, the communication flow between operational systems 115-1 and 115-2 is disrupted.

It should be noted that these conditions are easily verified by the monitoring system. In particular, the first condition is detected by the equipment items of the centralized monitoring system by the receipt of the message 115-1-Error-Fn1 through the communication network.

The second condition is detected by the equipment items of the centralized monitoring system by the absence of receipt of a state message originating from operational system 115-1. Each equipment item of the centralized monitoring system ascertains that this loss is not due to a breakdown of the communication medium by verifying that the communication path between operational system 115-1 and itself is not broken.

If communication between an operational system and an equipment item of the centralized monitoring system is available, alerts linked to this operational system advantageously are activated on the basis of the monitoring information items received from the monitored operational system. As a matter of fact, although monitoring of the communication medium is simple and robust, a theoretical loss of communication flow can be detected erroneously.

To this end, the equipment items of the centralized monitoring system advantageously develop a communication flow validity information item based on the actual receipt or non-receipt of the information items and not on the observation of the state of the communication medium. In this way, the failure of a communication flow is considered as such only in the absence of receipt of messages from the corresponding operational system.

For example, the information item determined by equipment item 120-1 of the monitoring system according to which one of the paths PATH(105-1), PATH(105-1, 105-2) or PATH(105-1, 105-3) is not valid, is to be confirmed, for example by the absence of receipt of messages from operational system 115-1.

For each of the alerts defined in the centralized monitoring system, the activation logic for these alerts takes into account the conditions for activation.

Figure 2:
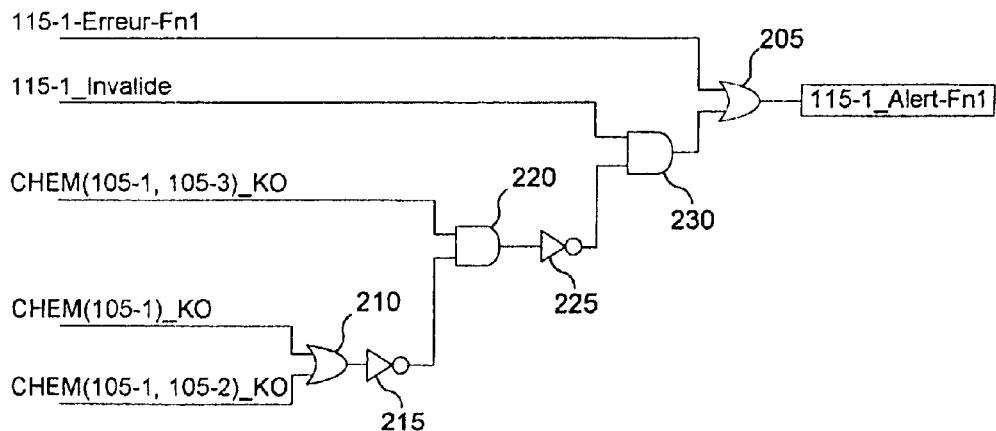
FIG. 2 shows an example of implementation of a logic circuit that can be used for activation of an alert by an equipment item of the monitoring system.

FIG. 2 shows an example of implementation of a logic circuit 200 that can be used for activation of alert 115-1_Alert-Fn1 by equipment item 120-1 of the monitoring system. As illustrated by OR 205, alert 115-1_Alert-Fn1 is activated only if one or the other of the two following conditions is met, equipment item 120-1 of the monitoring system has received a message 115-1-Error-Fn1 corresponding to alert 115-1_Alert-Fn1 from operational system 115-1; or, the validated state combination for paths PATH(105-1), PATH(105-1, 105-2) and PATH(105-1, 105-3) is such that equipment item 120-1 of the monitoring system is unable to exchange data with operational system 115-1.

The state combination for paths PATH(105-1), PATH(105-1, 105-2) and PATH(105-1, 105-3) consists here in performing the following operations, determining the OR 210 between the values of PATH(105-1) and PATH(105-1, 105-2) and reversing the result in reverser 215;

determining the AND 220 between the value obtained at the output of reverser 215 and the value of PATH(105-1, 105-3) and reversing the result in reverser 225; and determining the AND 230 between the value obtained at the output of reverser 225 and the value of validation condition 115-1_Invalid (the value of 115-1_Invalid is FALSE if a message is received from operational system 115-1 by equipment item 120-1 of the monitoring system, otherwise it is TRUE.

Figure 3:
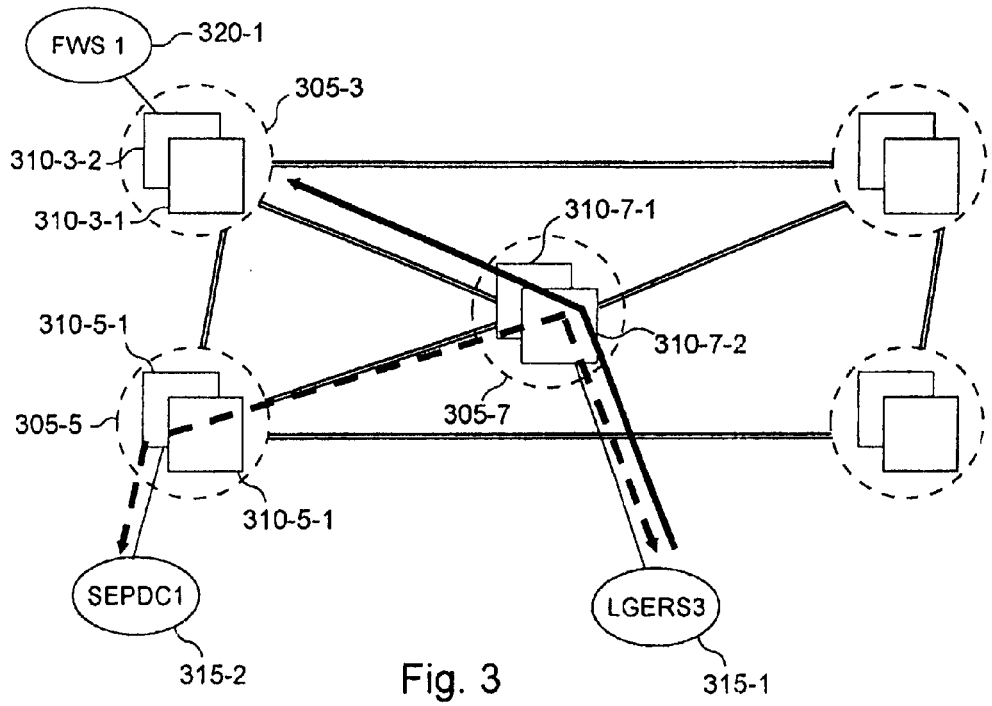
FIG. 3 presents an example of implementation of the invention for monitoring an operational system of LGERS type (Landing Gear Extension and Retraction System)

As illustrated on FIG. 3, the invention can be implemented, for example, to control an operational system LGERS3 (Landing Gear Extension and Retraction System) referenced 315-1, connected to a node 305-7 of a network comprising switches 310-7-1 and 310-7-2. Breakdown conditions are, for example, the following, LGERS3 315-1 declares itself broken down (Boolean variable LGERS3_FAULT);

LGERS3 315-1 loses its connection to the network (loss of the node comprising switches 310-7-1 and 310-7-2); or, LGERS3 315-1 loses communication with operational system SEPDC1 (Supplementary Electrical Power Distribution Center 1), referenced 315-2, connected to a node 305-5 of the network comprising switches 310-5-1 and 310-5-2. The loss of communication is expressed by the loss of path PATH(305-5, 305-7).

It should be noted here that the third condition is included in the second.

The thick unbroken-line arrow represents transmission of the LGERS3 315-1 status indicator to FWS1 320-1 while the thick dotted-line arrow represents communication between LGERS3 315-1 and SEPDC1 315-2.

The first condition is detected by FWS1 (Flight Warning System 1), referenced 320-1 by receipt through the communication medium of the value of the Boolean variable LGERS3_FAULT transmitted by operational system LGERS3 315-1. The second condition is characterized by the loss of the two components of node 305-7, that is, here switches 310-7-1 and 310-7-2. The third condition is characterized by the loss of communication path PATH(305-5, 305-7).

If a breakdown occurs in switches 310-3-1 and 310-7-2, operational system FWS1 320-1 loses communication with operational system LGERS3 315-1. The operational system LGERS3 315-1 breakdown alert, however, is inhibited because the loss of path PATH(305-3, 305-7) is not a breakdown condition of the LGERS3 315-1 function.

Likewise, if a breakdown occurs in switches 310-3-1, 310-7-2 and 310-5-1, operational system FWS1 320-1 loses communication with operational system LGERS3 315-1. In this case, operational system FWS1 320-1 activates an LGERS3 315-1 alert because the detection of a loss of path PATH(305-5, 305-7), here due to a breakdown of switches 310-5-1 and 310-7-2, is a breakdown condition of operational system LGERS3 315-1.

Finally, if a breakdown occurs in switches 310-5-1 and 310-7-2, operational system FWS1 320-1 still receives the LGERS3 315-1 state message and an alert concerning operational system LGERS3 315-1 is activated only if this state message signals a problem on the LGERS3 315-1 function.

Figure 4A:
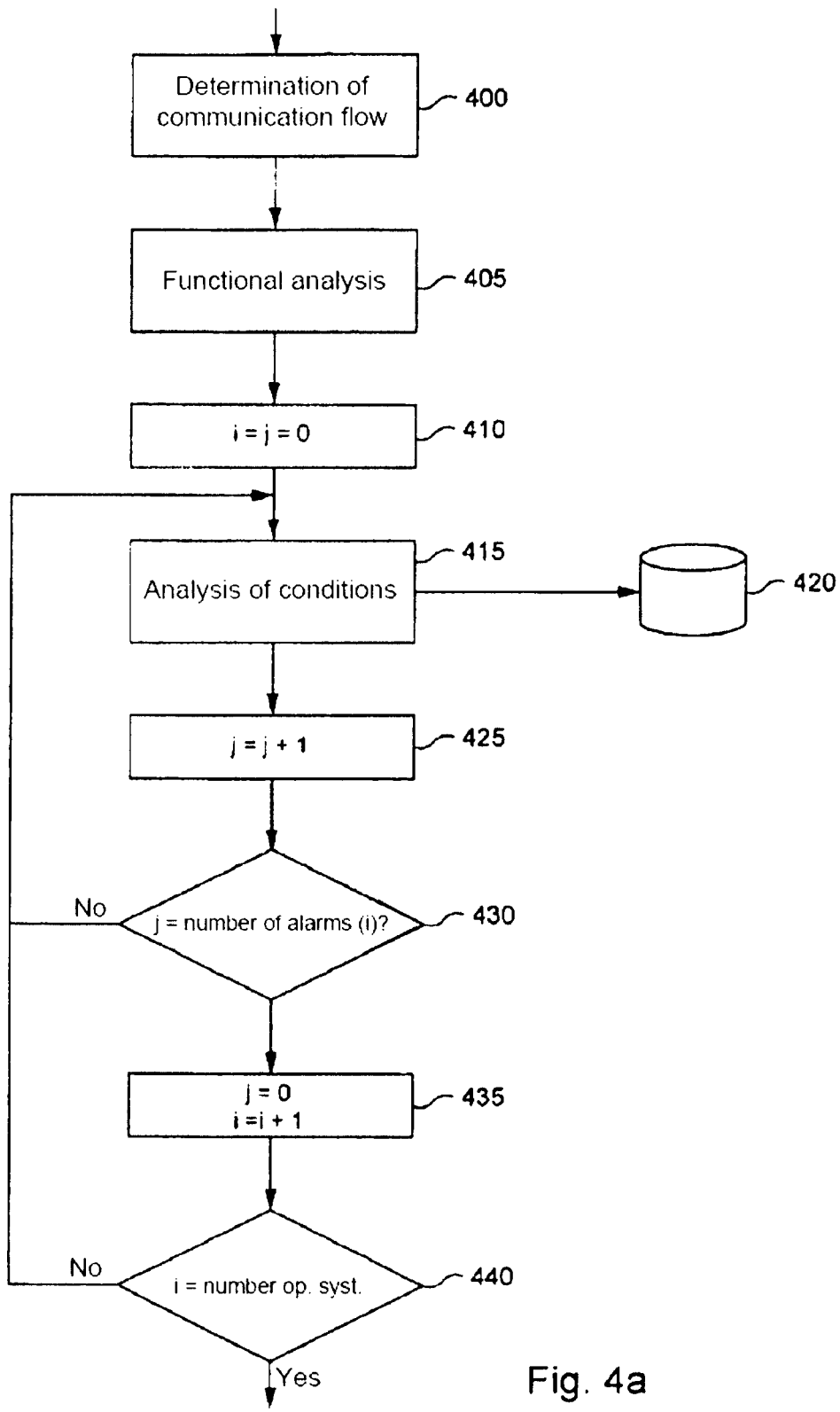
FIG. 4, consisting of FIGS. 4a and 4b, illustrates an example of the algorithm used to implement the invention; and, FIG. 5 shows an exemplary apparatus making it possible to implement the invention.
Figure 4B:
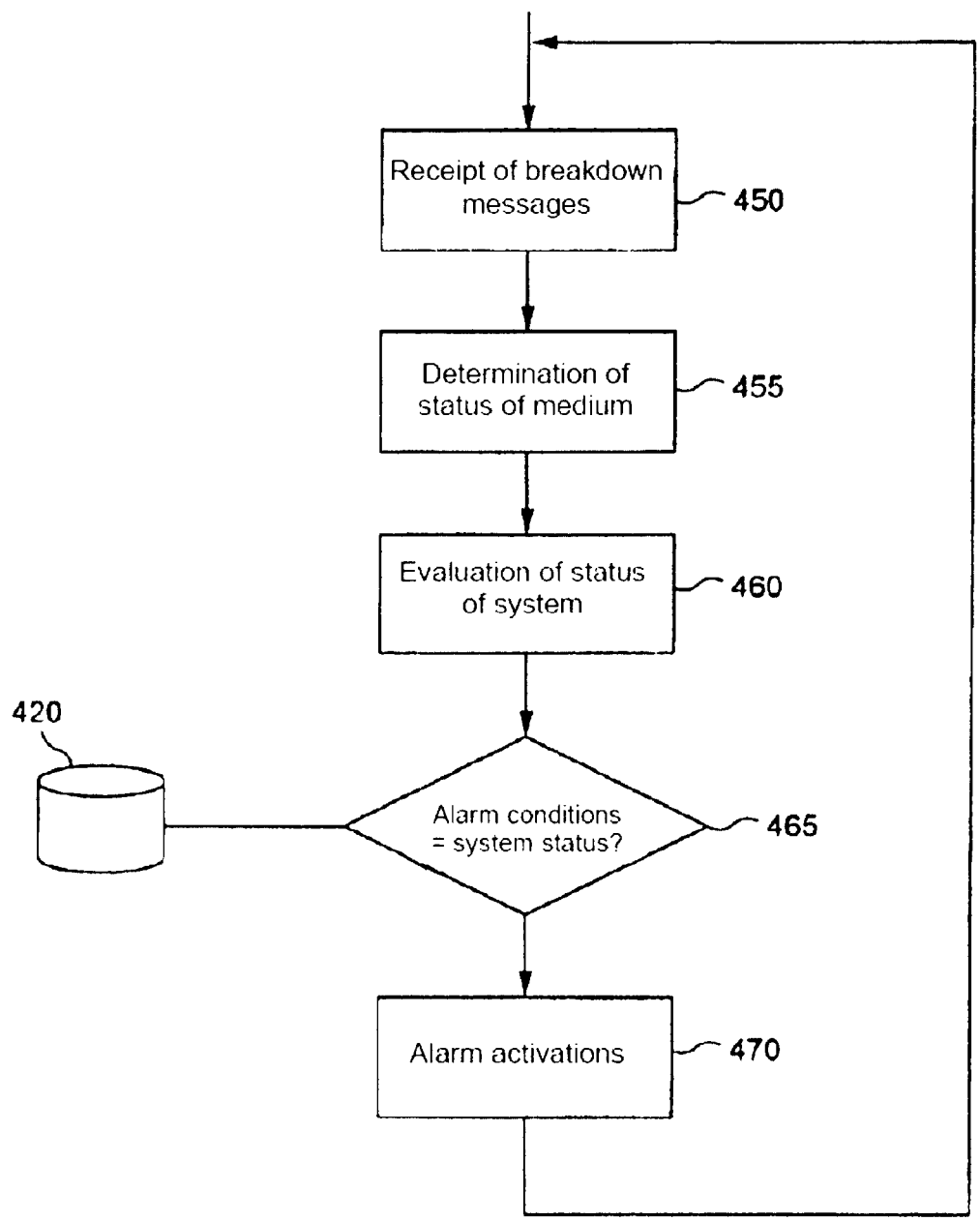

FIG. 4, consisting of FIGS. 4a and 4b, illustrates an example of an algorithm used to implement the invention. FIG. 4a shows the portion of the algorithm used during the preliminary analysis phase while FIG. 4b shows the portion of the algorithm used to monitor the shared communication medium.

As illustrated on FIG. 4a, after the communication flows in the shared communication medium have been determined (step 400), a functional study of the shared communication medium is conducted (step 405). Indexes i and j are initialized at zero (step 410). The value i here represents the index of the selected operational system whereas the value j represents the index of the selected alarm of the operational system i.

The conditions of alarm j of operational system i then are determined according to the breakdown conditions for alarm j of operational system i and according to the functional analysis of the communication medium performed (step 415). To this end, the conditions under which the breakdown of one or more components of the communication medium is to activate alarm j of operational system i are determined. The set of conditions determined in this way here is stored in memory in a table 420.

Index j then is incremented by one (step 425) and a test is performed to determine whether index j is equal to the number of alarms of operational system i (step 430). If index j is not equal to the number of alarms of operational system i, the two preceding steps (415 and 425) are repeated.

If index j is equal to the number of alarms of operational system i, index j is reinitialized to zero and index i is incremented by one (step 435). A test then is performed to determine whether index i is equal to the number of operational systems to be monitored (step 440). If index i is not equal to the number of operational systems to be monitored, steps 415 to 440 are repeated. If on the contrary index i is equal to the number of operational systems to be monitored, the preliminary phase is terminated, that is, the conditions for activation of the alarms of the operational systems to be monitored have been determined.

FIG. 4b illustrates an example of the algorithm used to monitor a communication medium and operational systems in order to activate one or more alarms if necessary.

The messages transmitted by the operational systems to signal a breakdown are received by the monitoring system (step 450) if the state of the communication medium so permits. Simultaneously, before or afterwards, the monitoring system determines the status of the communication medium from, for example, the node state indicators as described above (step 455).

These information items are used to establish an overall status of the monitored system (step 460), that is, of the operational systems and of the communication medium. This status then is compared with the conditions for activation of alarms stored in memory, for example in table 420 (step 465). If these conditions for activation of one or more alarms are met, the corresponding alarm or alarms are activated (step 470). Steps 450 to 470 then are repeated to monitor the system continuously.

FIG. 5 illustrates an example of apparatus 500, such as a microcomputer, adapted for implementing the invention. Apparatus 500 is an example of an equipment item of the monitoring system.

Apparatus 500 preferably comprises a communication bus 502 to which there are connected, a central processing unit 503 such as a microprocessor;

a read-only memory 504 or Read Only Memory (ROM), that can comprise one or more programs "Prog";

a random-access memory 506 or Random Access Memory (RAM), comprising registers adapted for storing in memory variables and parameters created and modified during execution of the aforementioned programs; and a communication interface 518 connected to a distributed communication network 520, the interface being capable of transmitting and receiving data.

Apparatus 500 optionally can have one, several or all of the following devices:

- a screen 508 for displaying data and/or serving as a graphical interface with the user who will be able to interact with the programs according to the invention, with the aid of a keyboard 510 or any other means such as a pointing device, as, for example, a mouse 511 or a light pen, a touch-sensitive screen or a remote control;
- a hard disk 512 that can comprise programs and/or data, in particular data processed or to be processed according to the invention;
- a diskette reader 514 adapted for receiving a diskette 516 and for reading or writing therein data processed or to be processed according to the invention; and,
- a memory card reader adapted for reading or writing data therein, in particular data processed or to be processed according to the invention.

The communication bus allows communication and interoperability among the different components included in apparatus 500 or connected thereto. The depiction of the bus is not limitative and, in particular, the central unit is capable of communicating instructions to any component of apparatus 500, directly or through another component of apparatus 500.

The executable code of the program or programs making it possible for apparatus 500 to implement the processes according to the invention can be stored, for example, in hard disk 512 or in read-only memory 504.

According to one variant, diskette 516 can contain data as well as the executable code of the aforementioned programs which, once read by apparatus 500, can be stored in hard disk 512.

Alternatively, the executable code of the programs can be received through communication network 520, via interface 518, to be stored in a manner identical to that described above.

The diskettes can be replaced by any information medium such as, for example, a compact disk (CD-ROM) or a memory card. Generally speaking, an information storage means, readable by a computer or by a microprocessor, integrated or not into the apparatus, possibly removable, is suitable for storing in memory one or more programs the execution of which allows implementation of the method according to the invention.

More generally, the program or programs will be able to be loaded into one of the storage means of apparatus 500 before being executed.

Central unit 503 controls the execution of the instructions or portions of software code for the program or programs according to the invention, which instructions are stored in hard disk 512, in read-only memory 540 or in the other aforementioned storage components. During boot-up, the program or programs stored in a non-volatile memory, for example hard disk 512 or read-only memory 504, are transferred into random access memory 506 (RAM), which then contains the executable code of the program or programs according to the invention, as well as the registers for storing in memory the variables and parameters necessary for implementation of the invention.

It should be noted that the apparatus comprising the device according to the invention also can be a programmed apparatus. The instructions for the program or programs implementing the invention can, for example, be implemented in a programmable or specific integrated circuit (Application-Specific Integrated Circuit, ASIC).

Naturally, in order to satisfy specific needs, an individual competent in the area of the invention will be able to apply modifications in the foregoing description.

The invention claimed is:

1. A method for determining conditions for activation of at least one alarm of at least one avionic system and for monitoring the at least one avionic system connected to a communication medium that includes at least one active communication switch component, the method comprising:

identifying a plurality of predetermined communications paths through the communication medium having the at least one active communication switch component and connected to the at least one avionic system;

determining the conditions for activation of the at least one alarm according to a state of the at least one avionic system and a state of the at least one active communication switch component of the communication medium for each of the plurality of predetermined communications paths, one of the conditions corresponding to a disruption of communication along one of the plurality of communication paths, and the conditions for activation related to the at least one avionic system being different from conditions for activation related to another avionic system;

storing in a memory the conditions for activation of the at least one alarm and an identification of the at least one alarm;

determining, by a monitoring device, a state of the at least one active communication switch component of the communication medium;

evaluating, by the monitoring device, an indicator of a state of the communication medium from the state of the at least one active communication switch component of the communication medium and from communication flows through a plurality of communication paths of the communication medium;

selecting, by the monitoring device, an alarm from a plurality of alarms and activating the selected alarm according to the evaluated state of the communication medium and according to the conditions for activation of the at least one alarm stored in the memory;

determining, by the monitoring device, a breakdown of the at least one active communication switch component of the communication medium, and determining whether the breakdown has an impact on a function of the at least one avionic system, wherein the selecting selects and activates an alarm linked to the impact on the function of the at least one avionic system, in response to a determination that the breakdown of the at least one active communication switch component of the communication medium has the impact on the at least one avionic system; and selecting and activating, by the monitoring device, an alert indicating the at least one avionic system no longer is being monitored, in response to a determination that the breakdown of the at least one active communication switch component of the communication medium has no impact on the at least one avionic system and in response to the breakdown affecting communication between the at least one avionic system and the monitoring device.

2. The method according to claim 1, wherein another one of the conditions corresponds to an absence of receipt of a message from the at least one avionic system.

3. The method according to claim 1, wherein
the at least one active communication switch component is included in a first node,
another active communication switch component is included in a second node, and
one communication path of the predetermined communication paths identified by the identifying includes the first node, which includes the at least one active communication switch component, and the second node, which includes the another active communication switch component.

4. The method according to claim 1, wherein the conditions for activation of the at least one alarm indicating that a breakdown of the at least one active communication switch component directly impacts successful conducting of a flight.

5. The method according to claim 1, wherein the at least one avionic system is a landing gear extension and retraction system that communicates with a flight warning system and a supplementary electrical power distribution center via the at least one active communication switch component included in the communication medium.

6. A method performed by a monitoring device for monitoring at least one avionic system connected to a communication medium that includes at least one active communication switch component, the method comprising:
determining a state of the at least one active communication switch component of the communication medium;
evaluating an indicator of a state of the communication medium from the state of the at least one active communication switch component of the communication medium and from a predetermined modeling of communication flows through a plurality of communication paths of the communication medium;
selecting an alarm from a plurality of alarms and activating the selected alarm according to the evaluated state of the communication medium and according to a predetermined modeling of consequences of the evaluated state of the communication medium on a function of the at least one avionic system;
determining a breakdown of the at least one active communication switch component of the communication medium, and determining whether the breakdown has an impact on the function of the at least one avionic system, wherein
the selecting selects and activates an alarm linked to the impact on the function of the at least one avionic system, in response to a determination that the breakdown of the at least one active communication switch component of the communication medium has the impact on the function of the at least one avionic system; and
selecting and activating an alert indicating the at least one avionic system no longer is being monitored, in response to a determination that the breakdown of the at least one active communication switch component of the communication medium has no impact on the function of the at least one avionic system and in response to the breakdown affecting communication between the at least one avionic system and the monitoring device.

7. The method according to claim 6, wherein the determining the state of the at least one component of the communication medium is performed with the aid of an independent communication device that is independent of the communication medium.

8. The method according to claim 6, further comprising:
receiving an indication relating to a functioning of the monitoring device; and
evaluating the monitoring of the at least one avionic system according to the indication relating to the functioning of the monitoring device and to the indicator of the state of the communication medium.

9. The method according to claim 6, further comprising:
confirming the indicator of the state of the communication medium.

10. The method according to claim 9, wherein the confirming is based on at least one information received from the at least one avionic system.

11. The method according to claim 6, wherein each of the plurality of alarms is defined by a logic specific to the at least one avionic system to which the indicator of the state of the communication medium is contributing.

12. The method according to claim 6, further comprising:
determining the state of the at least one active communication switch component of the communication medium to be one of a normal operating state or a malfunctioning state.

13. A monitoring device in an aircraft, the device comprising:
a processor configured to determine a state of at least one active communication switch component of a communication medium connected to at least one avionic system;
an evaluation section configured to evaluate an indicator of a state of the communication medium from the state of the at least one active communication switch component of the communication medium and from a predetermined modeling of communication flows through a plurality of communication paths of the communication medium; and
a selecting and activating section configured to select an alarm from a plurality of alarms and active the selected alarm according to the evaluated state of the communication medium and according to a predetermined modeling of consequences of the evaluated state of the communication medium on a function of the at least one avionic system, wherein
the selecting activating section is further configured to
determine a breakdown of the at least one active communication switch impact on the function of the at least one avionic system.,
select and activate an alarm linked to the impact on the function of the at least one avionic system, in response to a determination that the breakdown of the at least one active communication switch component of the communication medium has the impact on the function of the at least one avionic system; and
select and activate an alert indicating the at least one avionic system no longer is being monitored, in response to a determination that the breakdown of the at least one active communication switch component of the communication medium has no impact on the function of the at least one avionic system and in response to the breakdown affecting communication between the at least one avionic system and the monitoring device.

14. The device according to claim 13, wherein the processor is further configured to determine the state of the at least one active communication switch component of the communication medium to be one of a normal operating state or a malfunctioning state.

15. The device according to claim 13, wherein the processor is further configured to determine the state of the at least one component of the communication medium with the aid of an independent communication device that is independent of the communication medium.

16. The device according to claim 13, wherein the processor is further configured to receive an indication relating to a functioning of the monitoring device, and evaluate the monitoring of the at least one avionic system according to the indication relating to the functioning of the monitoring device and to the indicator of the state of the communication medium.

17. The device according to claim 13, further comprising:
   a confirmation section configured to confirm the indicator of the state of the communication medium.

18. The device according to claim 17, wherein the confirmation section confirms the indicator is based on at least one information received from the at least one avionic system.

19. The device according to claim 13, wherein each of the plurality of alarms is defined by a logic specific to the at least one avionic system to which the indicator of the state of the communication medium is contributing.

* * * * *